United States Patent

[11] 3,616,111

| [72] | Inventor | Harry Raech, Jr.<br>San Jose, Calif. |
|---|---|---|
| [21] | Appl. No. | 802,827 |
| [22] | Filed | Feb. 27, 1969 |
| [45] | Patented | Oct. 26, 1971 |
| [73] | Assignee | FMC Corporation<br>San Jose, Calif. |

[54] PLASTIC LANDING PAD OF INTERCONNECTED PANELS
8 Claims, 4 Drawing Figs.

[52] U.S. Cl............................................................ 161/37,
94/13, 156/304, 161/41, 161/113, 161/48,
161/231, 244/114
[51] Int. Cl........................................................ B32b 3/30
[50] Field of Search.......................................... 161/37, 41,
110–113, 114–117, 231, 38–39, 36, 50, 48;
244/114, 114.5; 156/304; 94/13

[56] References Cited
UNITED STATES PATENTS

| 3,351,513 | 11/1967 | Plenzer.................... | 161/41 X |
| 2,515,847 | 7/1950 | Winkler.................... | 161/112 X |
| 3,346,219 | 10/1967 | Salyer et al. ............ | 244/114 |
| 3,475,265 | 10/1969 | Santry..................... | 161/160 |
| 1,493,447 | 5/1924 | Heppes..................... | 161/111 |
| 2,778,761 | 1/1957 | Frieder et al. .......... | 161/115 X |
| 3,301,732 | 1/1967 | Kunz........................ | 156/304 |
| 3,075,429 | 1/1963 | Deddo....................... | 88/57.5 |

Primary Examiner—Philip Dier
Attorneys—F. W. Anderson and C. E. Tripp

ABSTRACT: A landing pad for helicopters is made of individual laminated panels having top and bottom laminae of woven fiberglass and a relatively thick core lamina of a non-woven organic fiber which is bonded to the said top and bottom laminae by a polyester resin extensively impregnated with a particulate filler. Upper and lower surfaces of the panels are textured with matching recesses and protuberances respectively which give the panels an interlocking characteristic that is effective when the panels are laid upon one another in separate layers. In final form the layers of laminated panels are stapled together to give a cohesive landing pad of high durability.

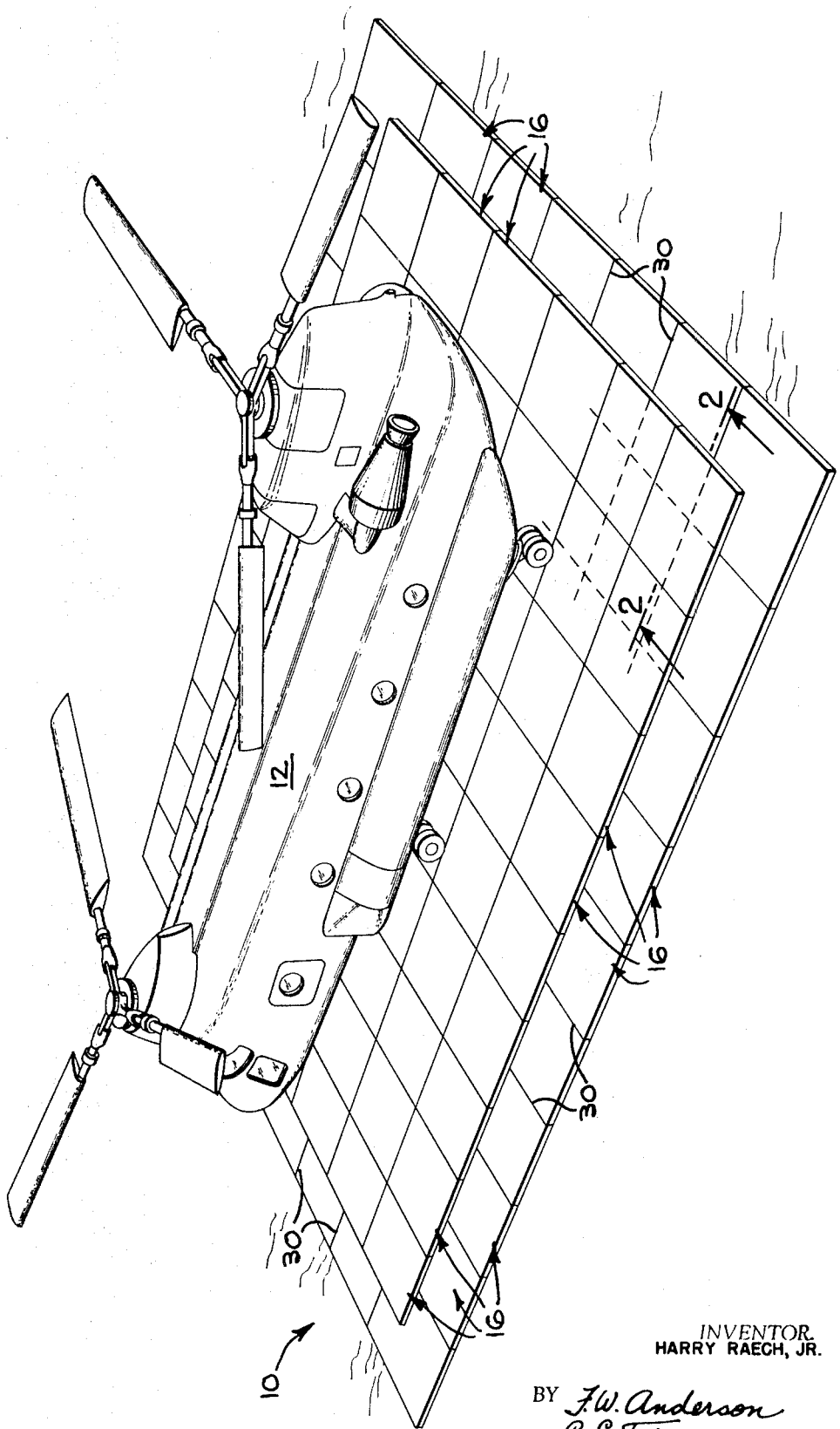

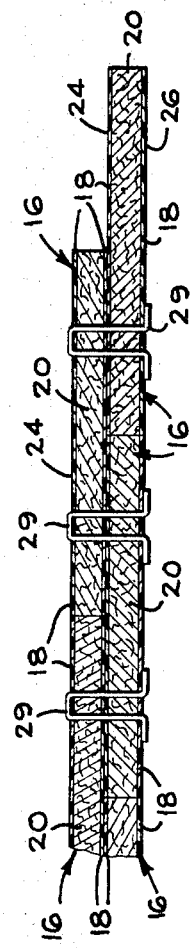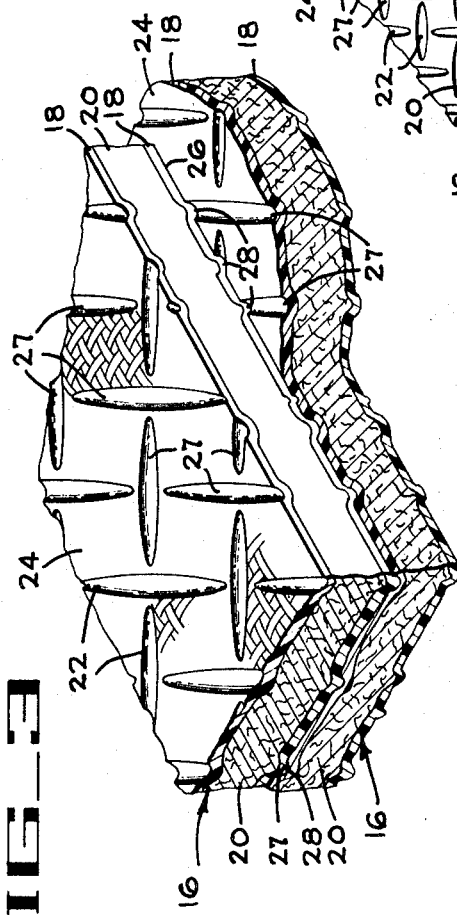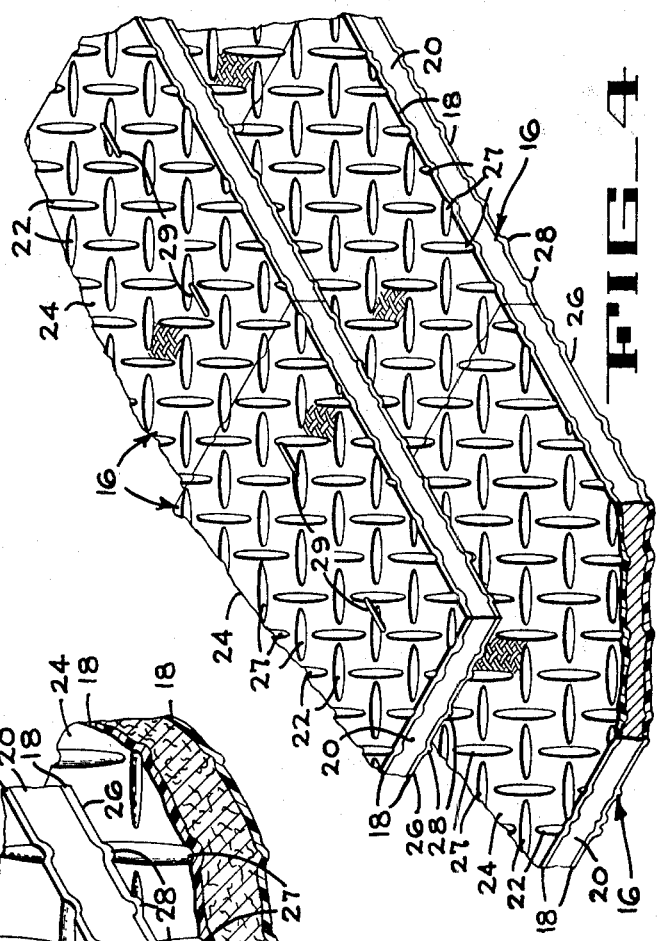

PLASTIC LANDING PAD OF INTERCONNECTED PANELS

BACKGROUND OF THE INVENTION

The development of aircraft capable of vertical takeoff, such as the helicopter, has stimulated much interest in portable landing pads. Due to their unique ability to land in small areas, helicopters are frequently called upon, particularly in military use, to land at remote sites where landing surfaces are undesirable. The function of the landing pad is to alleviate the need of landing in muddy or dusty soil and to give the helicopter a desirable takeoff and landing surface.

Originally metal mats were used which of necessity, due to weight, were perforated extensively, exposing the soil underneath to erosion by the air blast of propeller-driven helicopters. Also the metal pads would corrode or sink into muddy soil leaving a slick muddy surface.

In overcoming the weight problem, aluminum pads were developed which were more acceptable functionally, but were very expensive to make. The high expense was particularly felt by the military where frequently, expensive aluminum pads would have to be left in enemy territory.

The high expense of aluminum pads, and the resultant donation of valuable property to the enemy when the military was forced to abandon a landing pad in enemy territory, brought about research for development of a durable yet inexpensive and expendable helicopter landing pad.

Immediately the thought of using plastic was investigated. One of the first pads made of plastic was an air-sprayed pad. This pad was literally sprayed onto the ground from an hovering aircraft which made it relatively easy to make, but it was far from being entirely acceptable as it was not durable. The air-sprayed solution would frequently cling to existing shrubbery, leaving the ground untouched, and would become easily shredded by air blasts from the helicopter propellers.

More recent plastic landing pads with increased durability have increased in price of production to the point where they are nearly as expensive as the earlier aluminum pads.

SUMMARY OF THE INVENTION

The present invention is concerned generally with pads, or platforms, which may be used as helicopter landing pads, but more particularly it is concerned with a low-cost expendable landing pad of high durability.

The pad is comprised of a plurality of panels interconnected to form a relatively large blanket-type platform. The platform is flexible to conform to uneven terrain and durable to withstand heavy loads as well as the high-velocity air from helicopter propellers.

The individual panels, which in combination constitute the landing pad, are a unique laminate of fiber glass, sisal or similar organic fibers, and mineral-filled polyester resin. The top and bottom laminae are made of a strong yet inexpensive weave of fiber glass roving. The inner or core lamina is a nonwoven organic fiber mat such as sisal, jute, or hemp, and comprises the bulk of the pad. The three laminae are bonded together with a polyester resin which has been extensively impregnated with a particulate filler.

The panels are characterized by an interrupted tread on the upper and lower surfaces. The upper surface tread consists of a predesigned pattern of elongated recesses while the lower surface tread is a matching pattern of elongated protrusions. When laid on top of each other, the panels interlock through the mating of the respective recesses and protrusions, and prevent lateral movement of the panels. The panels are thus capable of multilayer application and provide a relatively stable, cohesive platform; however, for more permanence, it is desirable to mechanically fasten the layers of panels together preferably by an air-powered stapling gun.

In addition to the mating characteristic, the upper tread provides a high-friction takeoff-and-landing surface, and the lower protruding tread serves to anchor the pad to the ground for more stability.

A panel is typically formed by pressing the appropriately assembled laminate between textured metal plates at a moderately high temperature. The texture of the metal plates is such that, upon formation of the panels, the above-mentioned treads are imprinted on the upper and lower surfaces.

The completed pad is constructed by laying one layer of the panels in abutting side-by-side relationship and superimposing thereon the desired number of additional layers, usually determined by load requirements. The interlocked layers are then stapled together to complete the highly durable, low-cost and expendable landing pad.

Accordingly, it is an object of the invention to provide a low-cost expendable landing pad of high durability Another object is to provide a landing pad comprised of a plurality of interlocking panels.

Another object is to provide a pad made of laminated panels having top and bottom laminae of a strong weave of fiber glass roving and an inner or core lamina of nonwoven organic fiber mat which is bonded to the top and bottom laminae with a polyester resin impregnated with a particulate filler.

Another object is to provide a landing pad having tread on both the top and the bottom surfaces to respectively create a high-friction takeoff-and-landing surface and to anchor the pad for greater stability.

Still another object is to provide a pad made of laminated panels which are inexpensive to manufacture, relatively light in weight, and adaptable to being joined in a strong and durable platform.

BRIEF DESCRIPTION OF THE DRAWINGS

FIG. 1 is a perspective view of the landing pad with a helicopter resting thereon.

FIG. 2 is an enlarged sectional view with part broken away taken on line 2–2 of FIG. 1.

FIG. 3 is an enlarged fragmentary view in perspective showing one edge of the upper panel and showing the lower panel and part of the upper panel in cross section to illustrate the interlocking characteristic of the panels.

FIG. 4 is a perspective view with part broken away to show the proper overlapping of the panels.

DESCRIPTION OF THE PREFERRED EMBODIMENT

The helicopter landing pad of the present invention is generally designated 10 and shown in full in FIG. 1 with a helicopter 12 resting on its upper surface. As can be seen, the pad is comprised of a plurality of panels 16. The panels 16 are laid out in layers so that the overlying panels mate with and interlock panels of an adjacent lower layer as will be explained in more detail later. The pad illustrated in FIG. 1 is shown to have only two layers of panels 16, but it is to be understood that the pad can have any number of layers as the panels are adapted for multilayer application. The fact that the pad 10 is composed of a plurality of panels 16 makes it apparent that it can be made in a variety of sizes and shapes depending on the sizes of the aircraft which use it and the available ground on which it is to be laid.

Each of the individual panels 16, which in combination comprise the landing pad 10, are a unique laminate of woven fiber glass and nonwoven organic fiber. They can be made of various dimensions, but it has been found that square panels 3 feet on each side and one-half inch thick are easily handled and yet are large enough so that it does not require an unreasonable number of panels to construct a landing pad. The outermost layers 18 of the panels are made of an inexpensive yet strong fabric, such as woven fiber glass roving. An example of such fabric is the product commercially known as Trevarno KC 2408 marketed by Hexcel Corp. The innermost layer 20 is made of a nonwoven organic fiber such as sisal, jute, or hemp, and comprises the bulk of the panel. The laminae are bonded together with a polyester resin highly impregnated with a particulate filler. A suitable polyester would be propylene maleate phthalate of medium unsaturation with an equal weight of styrene as a monomer and benzoyl peroxide as a catalyst. A suitable 42,000, Acid Green 11 of C.I. No. 49,039 filler would be 300-mesh calcium carbonate.

An interrupted tread 22 is imprinted on the upper face 24 and the lower face 26 of the panels 16. the upper surface tread 22 consists of a predesigned pattern of elongated recesses 27 while the lower surface tread 22 is a matching pattern of elongated protrusions 28 of the same size and shape. The respective recesses and protrusions serve three purposes. First, the upper tread of recesses provides a high-friction surface for safer takeoffs and landings; secondly, the lower protruding tread serves as an anchor to stabilize the completed pad and keep it from moving on the adjacent soil; and thirdly, the recesses and protrusion in combination provide an interlocking instrumentality to tie the panels in an upper layer of the pad to panels in a lower layer and prevent lateral movement of the panels. The interlocking is effected when the protrusions on the lower surface of a panel in an upper layer are placed in the matching recesses on the upper surface of at least two panels in the layer next below. The panel in the upper layer serves as a binder to prevent the lower panels from moving laterally and conversely the lower panels prevent the upper panel from doing the same. The combined binding effect of panels in both upper and lower layers serves to unify the individual panels into one pad; however, for a more durable and lasting pad, it is desirable to mechanically fasten the individual panels together preferably by a high-powered stapling gun. The speed at which the stapling gun operates makes the insertion of staples 29 a very simple and quick job.

A panel is typically formed by pressing the appropriately assembled laminae between textured metal plates at a moderately high temperature. The best results have been obtained when the pressure was 150 pounds per square inch, the temperature was 250° F., and the panels were treated for 10 minutes. The texture of the metal pressure plates is such that under the above-specified treating conditions, the matching treads 22, of recesses and protrusions, are imprinted on the upper and lower respective surfaces of the panels. Laminated material of this type may be continuously manufactured on a heated belt-type machine having textured surfaces as mentioned above. The continuous strip of material can then be simply cut into the desired panel size.

When constructing the pad, the best results are obtained by first laying a lower ground-contacting layer of panels in side-by-side abutting relationship so that the protruding tread is directed downwardly. Next, an upper layer of panels is laid on top of the lower layer so that all of the joints of the lower layer are covered, except for joints 30 around the perimeter of the lower layer. This is best done by placing the four corners of an upper layer panel in the respective centers of four adjacent lower layer panels, as can be seen in FIG. 1 where several of the joints in the lower layer are shown by dotted lines. When the upper layer panels are so placed, the protruding tread on their lower surfaces will mate with the recesses in the top of the lower layer panels and interlock the panels. An air-powered stapling gun can then be used to very quickly staple panels in the upper layer to panels in the lower layer. Of course, this procedure can be repeated until the desired number of layers have been included in the landing pad.

Although the best mode contemplated for carrying out the present invention has been herein shown and described, it will be apparent that modification and variation may be made without departing from what is regarded to be the subject matter of the invention.

What I claim is:

1. A laminated helicopter landing pad comprising a plurality of panels having upper and lower laminae of woven fiber glass roving, a core lamina of fiber mat, and a bonding medium of polyester resin impregnated with a particulate filler, said panels having a tread of recesses on their upper surface and a matching tread of protrusions on their lower surface.

2. A platform comprising a plurality of panels having upper and lower layers of woven fiber glass roving, a core layer of organic fiber mat, and a bonding medium of polyester resin to secure the layers together, said panels having a tread of recesses on their upper surface and a matching tread of protrusions on their lower surface.

3. The landing pad of claim 1 wherein there are at least two layers of said panels, each layer consisting of a plurality of said panels disposed in abutting side-by-side relationship defining joints between panels, the joints of one layer being offset from the joints of an adjacent layer and the tread of protrusions on the lower surface of an upper layer mating with and fitting into the matching thread of recesses on the upper surface of the layer next below.

4. The landing pad of claim 1 wherein said polyester resin is propylene maleate phthalate of medium unsaturation with an equal weight of styrene as a monomer and benzoyl peroxide as a catalyst.

5. The landing pad of claim 4 wherein said particulate filler is 300-mesh calcium carbonate.

6. The landing pad of claim 3 wherein panels in one of said layers are stapled to panels in an adjacent layer.

7. The platform of claim 2 wherein there are at least two layers of said panels, each layer consisting of a plurality of said panels disposed in abutting side-by-side relationship defining joints between panels, the joints of one layer being offset from the joints of an adjacent layer and the tread of protrusions on the lower surface of an upper layer mating with and fitting into the matching tread of recesses on the upper surface of the layer next below.

8. The platform of claim 7 wherein panels in one of said layers are stapled to panels in an adjacent layer.

PO-1050
(5/69)

UNITED STATES PATENT OFFICE
CERTIFICATE OF CORRECTION

Patent No. 3,616,111          Dated October 26, 1971

Inventor(s) HARRY RAECH, JR.

It is certified that error appears in the above-identified patent and that said Letters Patent are hereby corrected as shown below:

Column 3, line 2 - delete "42,000, Acid Green II of C.I. No. 49,039" and insert -- particulate --.

Signed and sealed this 11th day of July 1972.

(SEAL)
Attest:

EDWARD M. FLETCHER, JR.          ROBERT GOTTSCHALK
Attesting Officer          Commissioner of Patents